Jan. 22, 1957 G. H. EASH 2,778,637

ENDLESS MAGNETIC TAPE CARTRIDGE

Filed July 30, 1954

INVENTOR.
GEORGE H. EASH
BY Malcolm W. Fraser
ATTY.

United States Patent Office 2,778,637

Patented Jan. 22, 1957

2,778,637

ENDLESS MAGNETIC TAPE CARTRIDGE

George H. Eash, Toledo, Ohio, assignor to George H. Poulsen, Toledo, Ohio; The Toledo Trust Company and Charles I. Poulsen, executors of the estate of said George H. Poulsen, deceased Application July 30, 1954, Serial No. 446,903

4 Claims. (Cl. 271—2.18)

This invention relates to magnetic recording and reproducing devices, and more particularly to magnetic recording devices employing a flexible spirally coiled record track of magnetic material which is impelled past a magnetic recording transducing head for magnetically recording signals on the record track and for reproducing the magnetically recorded signals.

An object is to produce a new and improved demountable magazine adapted to hold a spirally coiled endless tape employed, for example, as a record medium in sound recording and reproducing apparatus and to a mounting therefor.

Another object is to provide for the discharge or self-dissipating bleeding of charges of static electricity which develop on the tape convolutions because of the frictional working of the tape, one surface against the next, as the tape convolutions shift during the continuous take-off and re-wind.

Another object is to produce an endless magnetic recording tape having associated therewith tape-twisting guides, including means overlying the inner portion of the reel for facilitating the translatory movement of the tape.

A further object is to cause any convolutions which creep axially from the tape roll during rotation thereof to return to the desired normal position wherein the edges of the convolutions are all in substantially the same plane.

A still further object is to produce in an endless magnetic recording tape magazine friction eliminating means for facilitating the action of the continuous take-off and re-wind.

A still further object is to produce a demountable magazine for a coiled endless magnetic recording tape, together with cooperative mounting means whereby the magazine may be readily applied in position of use, thereby obviating troublesome adjustments and manipulations.

A still further object is to produce a new and improved magazine for magnetic sound tape having the new and improved features of construction, arrangement and operation hereinafter described.

An embodiment of the invention is shown on the accompanying drawings by way of illustration but not of limitation, and in said drawings Figure 1 is a top plan view of a magazine having an endless magnetic recording-reproducing tape mounted therein, the cover of the magazine being removed, the magazine being shown mounted in position of use upon a recording or playback machine;

Figure 1:
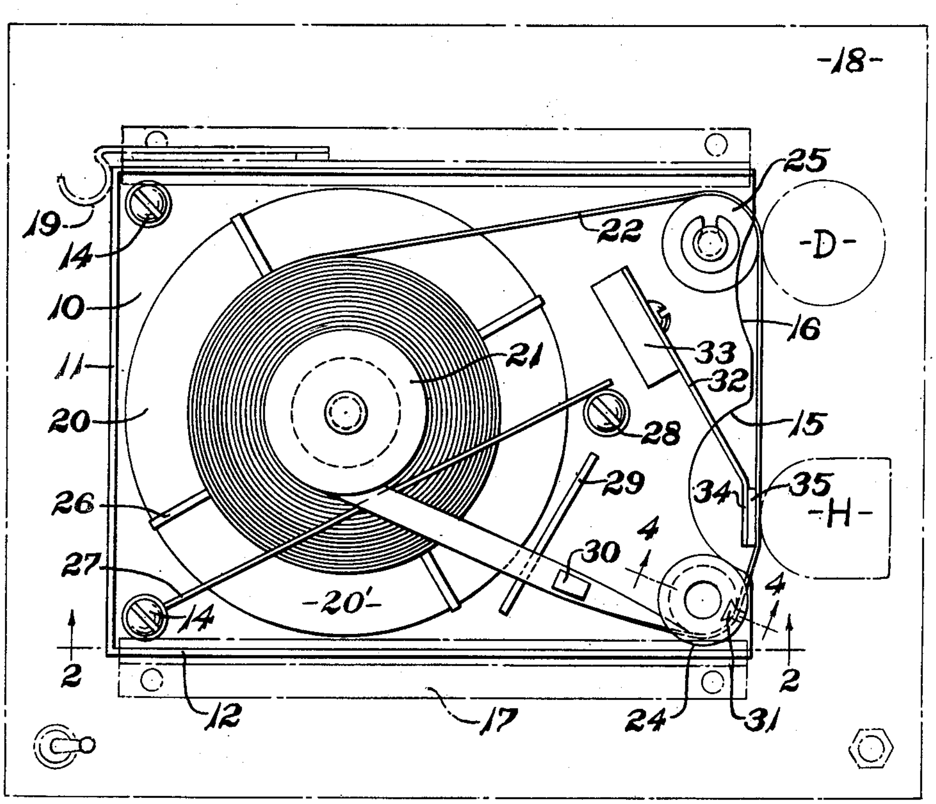
Figure 2:
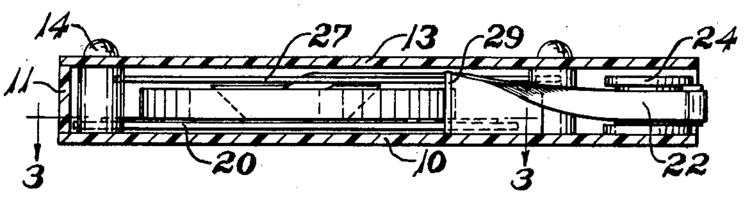
Figure 2 is a longitudinal sectional view substantially on the line 2—2 of Figure 1.
Figure 4:
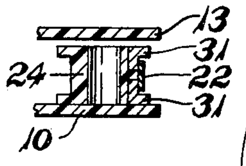
Figure 4 is a sectional view on the line 4—4 of Figure 1.
Figure 5:
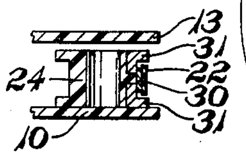
Figure 5 is a view similar to Figure 4, but showing an electrically conductive spot or piece on the tape engaging the roller such as to enable an electric circuit to be established to signal that a predetermined portion of the endless tape has been reached.
Figure 3:
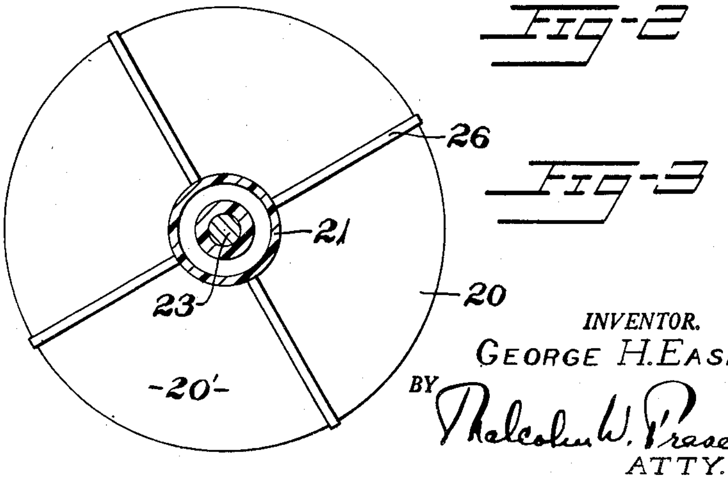
Figure 3 is a sectional view substantially on the line 3—3 of Figure 2.

The illustrated embodiment of the invention comprises a cartridge or magazine housing having a bottom wall 10, an upright end wall 11, and upright side walls 12. A top plate or cover 13 engages the end wall and side walls and is secured in place in this instance by a series of screws 14. The front end of the cartridge is open and as shown, the top and bottom walls have registering cut-outs 15 and 16 in the region of the drive roll and transducer head respectively, as will hereinafter appear. It will be understood that the cartridge thus formed is relatively thin and has flat top and bottom walls, as well as flat side walls, which are adapted to slide through parallel channels 17 fixed to the top of a recording or playback unit 18. A spring element 19 is adapted to hold the cartridge in place and urge it toward a drive wheel D and transducer head H, thereby to dispose the cartridge in the desired position of use.

Occupying the rearward portion of the cartridge is a reel 20 having a round bottom plate 20′ and a hub 21 about which is spirally wound the endless tape 22. Integral with the housing wall 10 and rising vertically therefrom is a post 23 upon which the reel is journalled with its bottom plate 20′ contiguous to the bottom wall 10 of the housing and its hub facing the cover 13. The side wall of the hub 21 is conical and flares upwardly and outwardly at an angle of about 50° with respect to the bottom plate 20′, so as to enable the innermost convolution of the roll of tape to be brought out to the top face of the roll. From the innermost convolution, the tape passes forwardly across the top face of the roll and outwardly over a flanged guide 24 mounted on the bottom wall 10. Thence, the tape extends transversely across the open end of the cartridge and about a roller 25 from which it passes to and becomes the outermost convolution of the roll. The loop of tape thus formed is exposed at the open front of the cartridge housing to be progressed past the transducer head as the tape is advanced by virtue of its being gripped between the roller 25 and the drive wheel D, the tape passing from the inside of the spiral roll to the outside, as described.

The relative movement between the convolutions of the tape in the spiral roll during operation generates static electricity, which, if not eliminated or removed, militates against the free and desired rotation of the roll and the smooth passage of its exposed loop from and back to the roll. To make possible the free turning of the tape roll in the first instance, the roll is dusted with powdered graphite so that some of it penetrates between the convolutions. In addition, however, an important feature of the invention resides in the provision of means for eliminating or removing static electricity from the roll and at the same time providing a continuing source of lubricant for the roll. The means best suited for this purpose has been found to consist of graphite strips 26 arranged radially of the plate 20′. As shown, four of these radially disposed rod-like strips are arranged equidistantly on the plate 20′ so as to have direct contact with the adjacent edge of all convolutions of the roll. These graphite strips may be secured in place in any suitable manner. For example, grooves may be formed in the plate 20′ to receive the strips which are preferably cylindrical in cross section. Not only do the graphite strips eliminate or remove the accumulation of static electricity, but they space the adjacent face of the spiral roll from the plate 20′ and thereby reduce the frictional engagement of the tape with the flat surface of the plate. Preferably, the strips 26 project but a very short distance above the surface of the plate. Instead of such graphite strips or rods, if desired thin metallic wires coated with graphite may be employed. While the static eliminating or removing elements 26 perform best if they are made of pure graphite, fairly satisfactory results are obtainable if these elements are made of graphite-bearing material, as for instance, bronze which is heavily loaded with graphite and is often used for oilless bearings.

It is important to guide the stretch of the loop of the tape leaving the spiral roll in such manner that it is free of contact with the top face of the roll, and for this purpose, a guide wire 27 is provided. This wire has one end conveniently socketed in one of the posts receiving an attaching screw 14 and then extends diagonally over the tape roll. In this instance, the opposite end of the wire abuts against an intermediate attaching post indicated at 28. It will be understood that the wire 27 is disposed slightly above the top face of the roll and provides a guide and spacer for the tape immediately as it leaves the hub 21. In this manner, the tape passes freely over the wire guide 27 and out of contact with the convolutions of the tape roll.

Not infrequently, some of the convolutions of the tape roll will creep axially upward or in a direction away from the graphite strips 26 and this is objectionable particularly because this moves the opposite edges of such convolutions from the graphite strips, resulting in the collecting of static charges in those convolutions and the consequent binding of the tape roll, thereby seriously interfering with the normal rotative movements of the reel. To eliminate this difficulty, the wire guide 27 not only extends substantially across all of the upper side of the tape roll, but also is arranged closely to that side, a 1/32 of an inch spacing being found to be satisfactory in service. As a result, when any convolution creeps axially upward, it gradually engages the wire guide 27 as the reel rotates and causes such convolution to move toward its normal position. Having been started in the proper direction toward the graphite strips, such convolution continues to move downwardly until it re-engages such strips, thereby to obviate the collection of static charges. If desired, this downward movement of the convolutions may be accomplished by a rib depending from the under side of the cover 13. It is further contemplated that the wire guide 27 may be graphite loaded for neutralizing or dissipating static charges.

Near the edge of the reel plate 20' is a flat bar 29, disposed with its length transversely to the travel of the tape and its width vertical with the lower edge resting on the bottom wall and the upper providing an additional guide for the tape in its travel to the flanged guide 24 and this guide also maintains the portion of the tape between the wire guide 27 and the guide 29 substantially parallel with the cartridge cover 13.

A small amount of conducting paint 30 is applied to the tape 22 at a predetermined point and this paint cooperates with a pair of spaced electrically conducting inserts 31 on the flanged guide 24 which is otherwise of electrically insulating material, the inserts 31 being adapted to be electrically connected to a suitable signal (not shown), thereby to signal that a predetermined point on the tape has been reached upon contact by the spot 30 bridging the inserts. The details of the signalling device and the electrical circuit therefor are not shown, since the same are old in the art and are readily understood by those skilled in this art.

A spring arm 32 has one end fixed to a block 33 secured to the bottom wall 10 of the cartridge housing, and the free end thereof inclines forwardly and terminates in an inclined end portion 34 which has a felt pad 35 on its forward side to press the adjacent portion of the tape against the transducer head H.

From the above description, it will be understood that I have produced an exceedingly simple and efficient cartridge containing an endless length of magnetic tape which can be quickly and conveniently mounted in position of use without the necessity of threading the tape from one reel to another as is required by most reproducer-recording instruments for this purpose. The mounting of the tape in such manner that it has free and unrestricted movement, eliminating the heretofore troublesome accumulation of static electricity and preventing the binding of the tape, are features of importance. Another important feature is the guiding of the innermost convolution from the reel so as to facilitate the free movement thereof, also contributing to the free and unrestricted movement of the tape. The means for indicating when a desired point on the tape has been reached is also of importance.

The dissipation of static electricity generated between the convolutions of the tape roll is extremely important in connection with a relatively large tape roll having several hundred feet of tape thereon, because of the relative movement of one convolution relative to the other during the take off and re-winding of the tape. It is believed that the static charges vary in intensity in different sections of the roll and unless efficient means is provided for dissipating such accumulated static charges, the convolutions bind to such an extent that free movement of the tape roll is impossible. This is obviated by the provision of the graphite strips which, of course, may vary in number and it appears that these strips militate against undesired accumulation of these charges in different portions or zones of the tape roll, thereby tending to equalize the charge throughout the roll. As a result, the static charges between the convolutions are kept so small as not to interfere with each other during the relative shifting movement of one convolution with respect to another.

It should also be noted that the use of graphite for the static eliminating or removing elements, because of the lubricating property of graphite, endows these elements with a dual function, namely removal of static electricity from the tape roll and lubrication of the tape to assure smooth running.

This application constitutes a continuation-in-part of the George H. Eash application Serial No. 434,982, filed June 7, 1954, entitled Endless Magnetic Tape Cartridge, now abandoned.

It is to be understood that numerous changes in details of construction, arrangement, operation and choice of materials may be effected without departing from the spirit of the invention especially as defined in the appended claims.

What I claim is:

1. A single-reel magnetic tape cartridge for use with a recording playback machine of the type having a transducer head and a drive wheel spaced therefrom for pulling the tape past the transducer head, said cartridge comprising: a substantially shallow housing having flat closely spaced top and bottom walls and substantially short upstanding peripheral walls extending all around the housing except at one end thereof to leave said end of the housing open at least at two transversely spaced zones, the spacing of which corresponds to that of the drive wheel and transducer head of a recording playback machine which is to receive the cartridge; a reel in the housing spaced from said open end thereof, said reel having a disk-like flange flatwise overlying the bottom housing wall and having a hub projecting upwardly from said flange, coaxial thereof; cooperating means on the reel hub and the housing mounting the reel for free rotation on an axis fixed with respect to the housing and normal to the reel flange and to the bottom housing wall; an endless spirally coiled roll of tape on said reel encircling the hub thereof and edgewise supported by the reel flange, said roll having a loop projecting therefrom toward the open end of the housing, one portion of said loop joining with the inner convolution of the roll and another portion of said loop joining with the outer convolution of the roll; spaced guide members carried by the housing in the interior thereof and at the same level as said reel, said guide members being arranged adjacent said open end of the housing, and around which said loop is trained to be held thereby with an intermediate portion of the loop extending between said guide members and with two spaced areas of said intermediate portion of the loop exposed for cooperation with the drive wheel and transducer head of a recording playback machine having the cartridge in place thereon, one of said guide members having that portion of the loop which joins with the inner convolution of the roll trained thereover, and the other guide member comprising a roller freely rotatably mounted on the housing with its axis in fixed parallel relationship to the reel axis and having that portion of the loop which joins with the outer convolution of the roll trained thereover, said roller being adapted to be positioned opposite the drive wheel of a recording playback machine having the cartridge in place thereon to maintain that exposed area of the loop which is in contact with the roller in flatwise frictional driving engagement with the drive wheel of a recording playback machine; and biasing means for yieldingly holding said other exposed portion of the loop in flatwise engagement with the transducer head of a recording playback machine having the cartridge in place thereon, said biasing means comprising a spring member mounted in the housing and having a resilient portion projecting toward the open end of the housing between said guide members to bear upon said other exposed portion of the loop and press the same outwardly toward engagement with the transducer head.

2. The cartridge set forth in claim 1 wherein the biasing means and said guide members are carried solely by the bottom wall of the housing; and further characterized by the fact that the top wall of the housing is provided by a cover detachably secured to the housing but removable therefrom to provide access to the housing interior.

3. As an article of manufacture, a reel for holding a roll of magnetic tape of the type employed in recording playback machines, said reel comprising: a bored hub around which magnetic tape may be wound; a substantially flat disk-like flange fixed to the hub at one axial end thereof with its opposite faces lying in planes substantially normal to the hub axis; and a series of elongated graphite strips mounted on the flange at that face thereof from which the hub projects, said graphite strips extending radially from the hub substantially to the periphery of the flange and being angularly spaced from one another but projecting a slight distance from said face of the flange to be engaged with the edges of the convolutions of tape wound about the hub to space said edges of the tape convolutions from the adjacent face of the flange, said strips providing for lubricating the tape convolutions and for dissipating static electric charges generated between the tape convolutions.

4. In a single-reel magnetic type cartridge for use with a recording play-back machine of the type having drive means for lengthwise advancing the tape in one direction past a transducer head: a housing having spaced top and bottom walls and having an open end; a reel mounted in the housing for rotation on an upright axis, said reel having a coaxial hub and having a flange at one end of the hub normal to the reel axis and flatwise overlying the bottom wall of the housing; an endless spirally coiled roll of magnetic tape on said reel encircling the hub thereof and edgewise supported by said flange, said roll having a loop of tape projecting therefrom toward the open end of the housing with one portion of the loop projecting from the convolution at the outer diameter of the roll, another portion of the loop projecting from the convolution at the inner diameter of the roll and an intermediate portion of the loop being exposed at the open end of the housing for cooperation with the drive means and transducer head of a recording play-back machine which is to receive the cartridge so that lengthwise advancing motion may be imparted to the loop to effect stripping of tape from the inner diameter of the roll and rotation of the reel in the direction to wind up tape on the outer diameter of the roll; a series of elongated graphite strips substantially radially mounted on the reel flange and projecting slightly from the upper face thereof to be engaged by the lower edges of the tape convolutions for spacing the same from the adjacent face of the flange, said strips providing for lubricating the tape convolutions as a consequence of the abrasive action of the convolutions thereupon produced by relative lengthwise movement of the convolutions relative to one another and to the reel which results from winding up the tape on a diameter of the roll larger than that at which the tape is stripped from the roll; and an elongated guide member carried by the housing, said guide member extending across the upper face of the roll of tape closely adjacent to the upper edges of the roll convolutions and substantially tangent to the inner diameter of the roll but positioned beneath said other portion of the loop which projects from the inner diameter of the roll to guide the tape stripped from the roll and constrain it to travel flatwise over the upper face of the roll in spaced relation thereto, said guide member being positioned to act upon convolutions of the roll that may creep upwardly into contact therewith in a manner to direct such convolutions downwardly into edgewise engagement with said graphite strips to assure lubrication of the convolutions and dissipation of static charges on the tape generated by the relative motion between the roll convolutions.

References Cited in the file of this patent

UNITED STATES PATENTS

| | | |
|---|---|---|
| 2,032,336 | Strauss | Feb. 25, 1936 |
| 2,238,719 | De Tartas | Apr. 15, 1941 |
| 2,248,293 | Woolf et al. | July 8, 1941 |
| 2,426,838 | Miller | Sept. 2, 1947 |
| 2,499,700 | Tinkham et al. | Mar. 7, 1950 |
| 2,609,457 | Thurm | Sept. 2, 1952 |
| 2,681,950 | Owens | June 22, 1954 |